US011908376B1

(12) United States Patent
Wang et al.

(10) Patent No.: US 11,908,376 B1
(45) Date of Patent: Feb. 20, 2024

(54) COMPENSATION SCHEMES FOR 1X1 SUB-PIXEL UNIFORMITY COMPENSATION

(71) Applicant: Apple Inc., Cupertino, CA (US)

(72) Inventors: Lingtao Wang, Cupertino, CA (US); Giovanni Carbone, Palo Alto, CA (US); Chaohao Wang, Sunnyvale, CA (US); Enkhamgalan Dorjgotov, Mountain View, CA (US); Sheng Zhang, San Jose, CA (US); Jim C Chou, San Jose, CA (US); Shereef Shehata, San Ramon, CA (US); Yung-Chin Chen, Saratoga, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/710,133

(22) Filed: Mar. 31, 2022

Related U.S. Application Data

(60) Provisional application No. 63/171,451, filed on Apr. 6, 2021.

(51) Int. Cl.
*G09G 5/10* (2006.01)
*G09G 5/06* (2006.01)
*G09G 3/3233* (2016.01)
*G09G 3/20* (2006.01)

(52) U.S. Cl.
CPC ... *G09G 3/2092* (2013.01); *G09G 2300/0842* (2013.01); *G09G 2320/0233* (2013.01); *G09G 2320/0276* (2013.01)

(58) Field of Classification Search
CPC ......... G09G 3/2092; G09G 2300/0842; G09G 2320/0233–0276
See application file for complete search history.

(56) References Cited

U.S. PATENT DOCUMENTS

| | | | |
|---|---|---|---|
| 10,013,907 B2 | 7/2018 | Nathan et al. | |
| 10,672,320 B2 | 6/2020 | Lin et al. | |
| 11,302,287 B1 * | 4/2022 | Allard | G06T 1/20 |
| 2004/0100433 A1 * | 5/2004 | Ham | G09G 3/3648 345/89 |

(Continued)

FOREIGN PATENT DOCUMENTS

| | | | |
|---|---|---|---|
| CN | 112419962 A * | 2/2021 | |
| WO | 2020053329 A1 | 3/2020 | |

*Primary Examiner* — Lin Li
(74) *Attorney, Agent, or Firm* — FLETCHER YODER PC

(57) ABSTRACT

A compensation system includes a processor configured to determine compensated data for display on a sub-pixel of the display device. The processor may receive image data configured to be displayed on the sub-pixel, convert the gray level data to first voltage data; fetch, from a memory, compressed 1×1 sub-pixel uniformity compensation data for the sub-pixel, and decompress the compressed 1×1 sub-pixel uniformity compensation data via a decompressor. The decompressed data comprises the 1×1 sub-pixel uniformity compensation data for the sub-pixel. The processor may also determine a voltage compensation offset value associated with the sub-pixel based on the second voltage data, generate compensated voltage data based in part on the voltage compensation offset value and the first voltage data, convert the compensated voltage data to compensated gray level data; and transmit the compensated gray level data to pixel driving circuitry associated with the sub-pixel.

20 Claims, 13 Drawing Sheets

(56) References Cited

U.S. PATENT DOCUMENTS

| | | | | |
|---|---|---|---|---|
| 2008/0174612 | A1* | 7/2008 | Someya | G09G 3/2044 345/89 |
| 2011/0148907 | A1 | 6/2011 | Lee | |
| 2013/0135272 | A1* | 5/2013 | Park | G09G 3/006 345/211 |
| 2018/0322844 | A1* | 11/2018 | Lee | G09G 5/10 |
| 2019/0066610 | A1* | 2/2019 | Yoshiga | G09G 3/3648 |
| 2020/0219432 | A1* | 7/2020 | Park | G09G 3/2003 |
| 2021/0065628 | A1* | 3/2021 | Kim | G09G 3/3233 |
| 2021/0118352 | A1* | 4/2021 | Baek | G09G 3/2007 |
| 2021/0150971 | A1* | 5/2021 | Pyun | G09G 3/3233 |
| 2021/0192998 | A1* | 6/2021 | Song | G09G 3/006 |
| 2021/0201779 | A1* | 7/2021 | Kim | G09G 5/06 |
| 2022/0036857 | A1* | 2/2022 | Kwon | G09G 5/10 |

* cited by examiner

| CODE | 8-BIT VOLTAGE OFFSET |
|---|---|
| 00 | OFFSET 1 |
| 01 | OFFSET 2 |
| 02 | OFFSET 3 |
| 03 | OFFSET 4 |

COMPENSATION SCHEMES FOR 1X1 SUB-PIXEL UNIFORMITY COMPENSATION

CROSS REFERENCE TO RELATED APPLICATIONS

This application claims priority from and the benefit of U.S. Provisional Application Ser. No. 63/171,451, entitled "COMPENSATION SCHEMES FOR 1×1 SUB-PIXEL UNIFORMITY COMPENSATION," filed Apr. 6, 2021, which is hereby incorporated by reference in its entirety for all purposes.

SUMMARY

This disclosure relates to compensation schemes for 1×1 sub-pixel uniformity compensation corrections on a display panel.

A summary of certain embodiments disclosed herein is set forth below. It should be understood that these aspects are presented to provide the reader with a brief summary of these certain embodiments and that these aspects are not intended to limit the scope of this disclosure.

Electronic displays may be found in numerous electronic devices, from mobile phones to computers, televisions, automobile dashboards, and augmented reality or virtual reality glasses, to name just a few. Electronic displays with self-emissive display pixels, such as light-emitting diodes (LEDs) such as organic light-emitting diodes (OLEDs) or micro-light-emitting diodes (μLEDs), generate images by emitting different amounts of light. As different display pixels emit different amounts of light, individual display pixels of an electronic display may collectively produce images.

In certain electronic display devices, light-emitting diodes such as organic light-emitting diodes (OLEDs), micro-LEDs (μLEDs), or active matrix organic light-emitting diodes (AMOLEDs) may be employed as pixels to depict a range of gray levels for display. However, due to various properties associated with the manufacturing of the display, the driving scheme of these pixels within the display device, and other characteristics related to the display panel, a particular gray level output by one pixel in a display device may be different from a gray level output by another pixel in the same display device upon receiving the same electrical input. As such, the digital values used to generate these gray levels for various pixels may be compensated to account for these differences based on certain characteristics of the display panel. For instance, a digital compensation value for a gray level to be output by a pixel may be determined based on optical wave or electrical wave testing performed on the display during the manufacturing phase of the display. In addition, the digital compensation value for the gray level may be determined based on real time color sensing circuitry, predictive modeling algorithms based on sensor data (e.g., thermal, ambient light) acquired by circuitry disposed in the display, and the like. Based on the results of the testing, sensing, or modeling, compensation data (e.g., a compensation map) may be determined for pixels of the electronic display.

Uniformity compensation is critical to improve visual quality of an electronic display (e.g., panel). To provide uniformity compensation during display operations of the electronic display, a compensation block may be included to apply additive or subtractive driving current to each sub-pixel through interval driving voltage/current or external driving digital code. The uniformity compensation data is calculated based on a compensation map generated from the panel uniformity calibration, and the compensation map is stored in the display system. The size of the compensation map may be proportional to the number of pixels and bit-depth of each compensation component. One challenge of providing uniformity compensation is the memory size limit of the compensation map used by the compensation block. In particular, storing a 1×1 compensation map (e.g., per sub-pixel compensation map) for each sub-pixel of an electronic display is costly in memory size. Another challenge of providing uniformity compensation is keeping sub-pixel mismatch low. It is beneficial to have per sub-pixel uniformity compensation with low sub-pixel mismatch in many display systems. For example, in a display system that could benefit from uniform visual quality with low sub-pixel mismatch such as an augmented reality virtual reality (AR/VR) display system, it may be preferred to have per sub-pixel uniformity compensation to achieve a target visual quality. Provided herein are techniques that allow for per sub-pixel compensation with reduced sub-pixel mismatch.

Specifically, techniques that provide for per sub-pixel compensation without compromising performance of uniformity compensation on the per sub-pixel mismatch are provided. These techniques include encoding a per sub-pixel compensation map using low bit-depth code. The encoded per sub-pixel compensation map may be stored with reduced file size and a look-up table for decoding the encoded per sub-pixel compensation map. The techniques also include applying a compression algorithm on a 1×1 sub-pixel uniformity compensation map to reduce file size and generate a compressed 1×1 sub-pixel uniformity compensation map. A decompressor is added to decompress data from the compressed 1×1 sub-pixel uniformity compensation map and determine uniformity corrections. The techniques also include generating a foveated compensation map, in which 1×1 sub-pixel uniformity compensation map is saved for the center of the panel where visual acuity is high, and 2×2 and 4×4 binning compensation map saved for periphery areas of the panel.

BRIEF DESCRIPTION OF THE DRAWINGS

Various aspects of this present disclosure may be better understood upon reading the following detailed description and upon reference to the drawings described below.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "example embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Example Electronic Devices and Components Thereof

Figure 1:
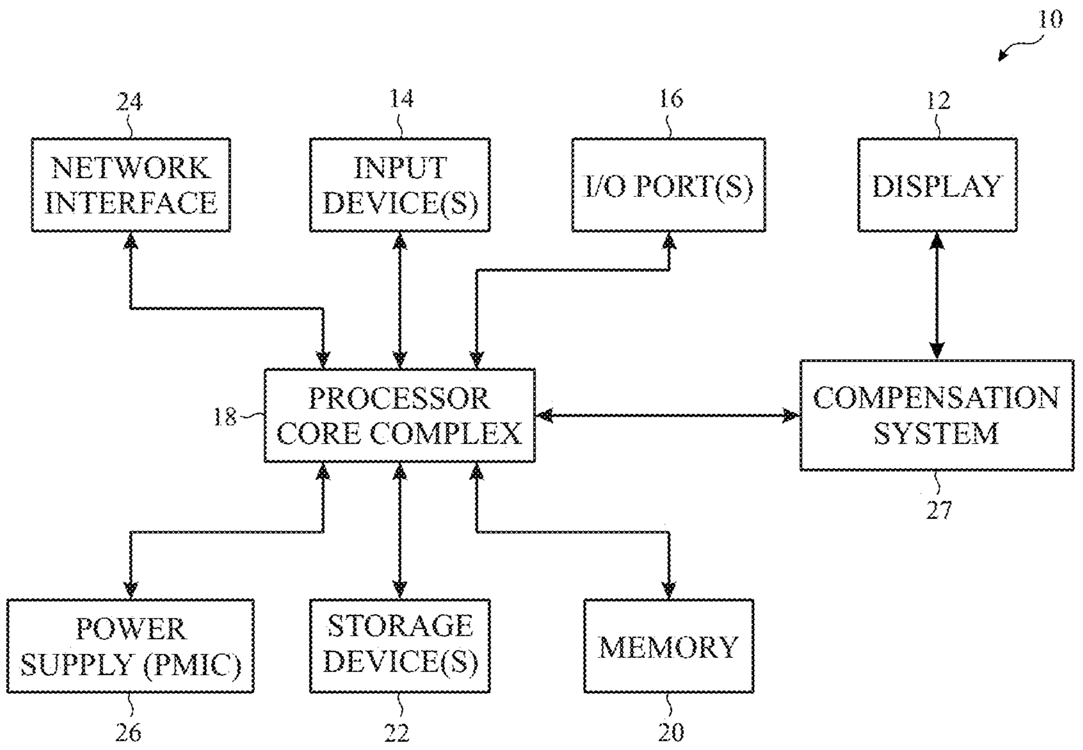
FIG. 1 is a schematic block diagram of an electronic device including a compensation system, in accordance with an embodiment of the present disclosure.

An example of an electronic device 10 (e.g., a display device), which includes an electronic display 12 that may benefit from the disclosed features, is shown in FIG. 1. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a vehicle dashboard, and the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor core complex 18 having one or more processors or processor cores and/or image processing circuitry, memory 20, one or more storage devices 22, a network interface 24, and a power supply 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the storage devices 22 may be included in a single component. Additionally or alternatively, image processing circuitry of the processor core complex 18 may be disposed as a separate module or may be disposed within the electronic display 12.

The processor core complex 18 is operably coupled with the memory 20 and the storage device 22. As such, the processor core complex 18 may execute instructions stored in memory 20 and/or a storage device 22 to perform operations, such as generating or processing image data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as image data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a 4G, LTE, or 5G cellular network. In other words, the network interface 24 may enable the electronic device 10 to transmit data (e.g., image data) to a communication network and/or receive data from the communication network.

The power supply 26 may provide electrical power to operate the processor core complex 18 and/or other components in the electronic device 10, for example, via one or more power supply rails. Thus, the power supply 26 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as image data, with the portable storage device.

The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12. The touch sensing components may receive user inputs by detecting occurrence and/or position of an object contacting the display surface of the electronic display 12.

In addition to enabling user inputs, the electronic display 12 may facilitate providing visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. The display pixels may represent sub-pixels that each control a luminance of one color component (e.g., red, green, or blue for an RGB pixel arrangement).

The electronic display 12 may display an image by controlling the luminance of its display pixels based at least in part on image data associated with corresponding image pixels in image data. In some embodiments, the image data may be generated by an image source, such as the processor core complex 18, a graphics processing unit (GPU), an image sensor, and/or the memory 20 or the storage device 22. Additionally, in some embodiments, image data may be received from another electronic device 10, for example, via the network interface 24 and/or an I/O port 16.

In the illustrated embodiment, the electronic device 10 includes a compensation system 27 (e.g., sub-pixel uniformity compensation system), which may include a chip (e.g., a system-on-chip), such as processor or ASIC, that may control various aspects of the display 12. It should be noted that the compensation system 27 may be implemented in the central processing unit (CPU), the graphics processing unit (GPU), image signal processing pipeline, display pipeline, driving silicon, or any suitable processing device that is capable of processing image data in the digital domain before the image data is provided to the pixel circuitry.

In certain embodiments, the compensation system 27 may compensate for non-uniform gray levels and luminance properties for each pixel of the display 12. Generally, when the same electrical signal (e.g., voltage or current) is provided to each pixel of the display 12, each pixel should depict the same gray level. However, due to various sources of noise, frame mura effects, color mixing due to mask misalignment, and the like, the same voltage being applied to a number of pixels may result in a variety of different gray levels or luminance values depicted across the number of pixels. As such, the compensation system 27 may determine one or more compensation factors to adjust a digital value provided to each pixel to compensate for these differences. The compensation system 27 may then adjust the data signals provided to each pixel based on the compensation factors.

Figure 2:
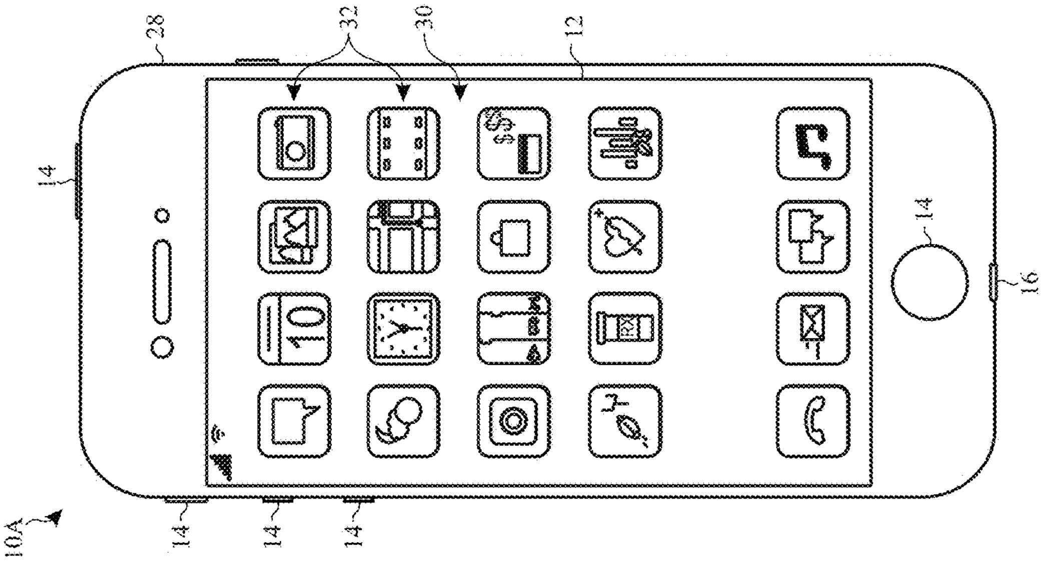
FIG. 2 is a front view of a mobile phone representing an example of the electronic device of FIG. 1, in accordance with an embodiment of the present disclosure.

One example of the electronic device 10, specifically a handheld device 10A, is shown in FIG. 2. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 28 (e.g., housing). The enclosure 28 may protect interior components from physical damage and/or shield them from electromagnetic interference. In the depicted embodiment, the electronic display 12 is displaying a graphical user interface (GUI) 30 having an array of icons 32. By way of example, when an icon 32 is selected either by an input device 14 or a touch sensing component of the electronic display 12, an application program may launch.

Input devices 14 may be provided through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 28. The I/O ports 16 may include, for example, a Lightning® or Universal Serial Bus (USB) port.

Figure 3:
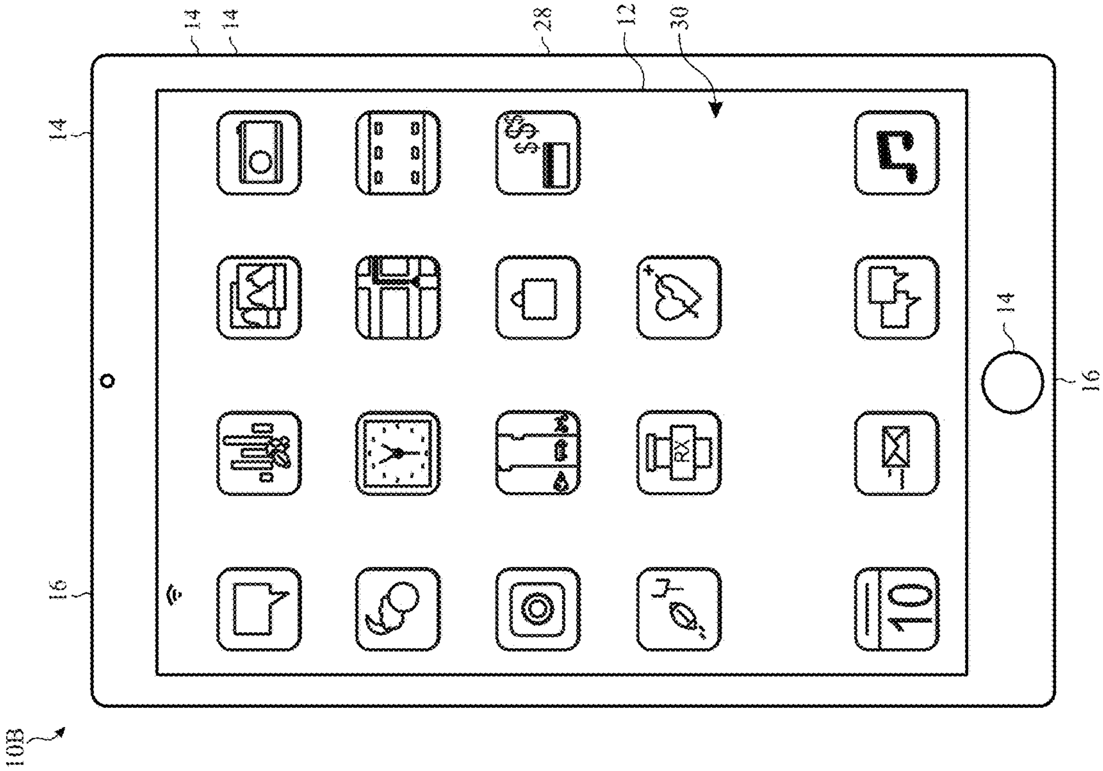
FIG. 3 is a front view of a tablet device representing an example of the electronic device of FIG. 1, in accordance with an embodiment of the present disclosure.
Figure 4:
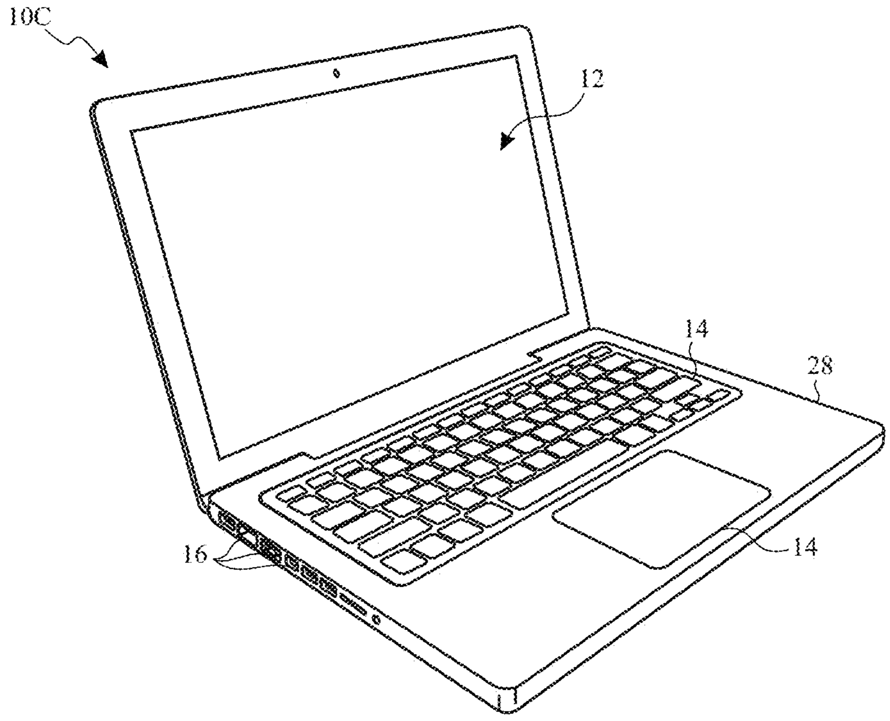
FIG. 4 is a front view of a notebook computer representing an example of the electronic device of FIG. 1, in accordance with an embodiment of the present disclosure.
Figure 5:
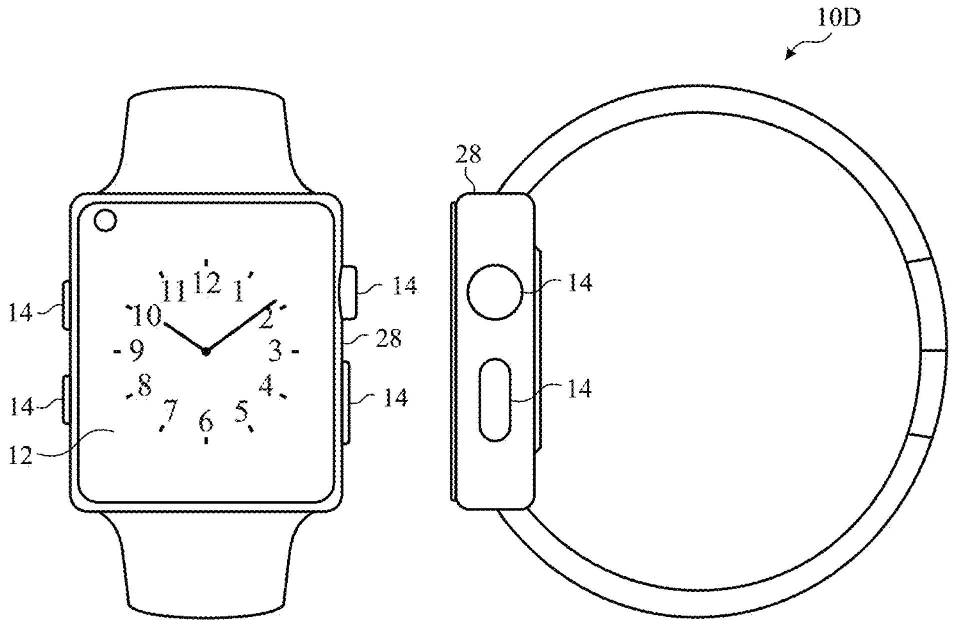
FIG. 5 are front and side views of a watch representing an example of the electronic device of FIG. 1, in accordance with an embodiment of the present disclosure.

The electronic device 10 may take the form of a tablet device 10B, as shown in FIG. 3. By way of example, the tablet device 10B may be any iPad® model available from Apple Inc. A further example of a suitable electronic device 10, specifically a computer 10C, is shown in FIG. 4. By way of example, the computer 10C may be any MacBook® or iMac® model available from Apple Inc. Another example of a suitable electronic device 10, specifically a watch 10D, is shown in FIG. 5. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 28.

Figure 6:
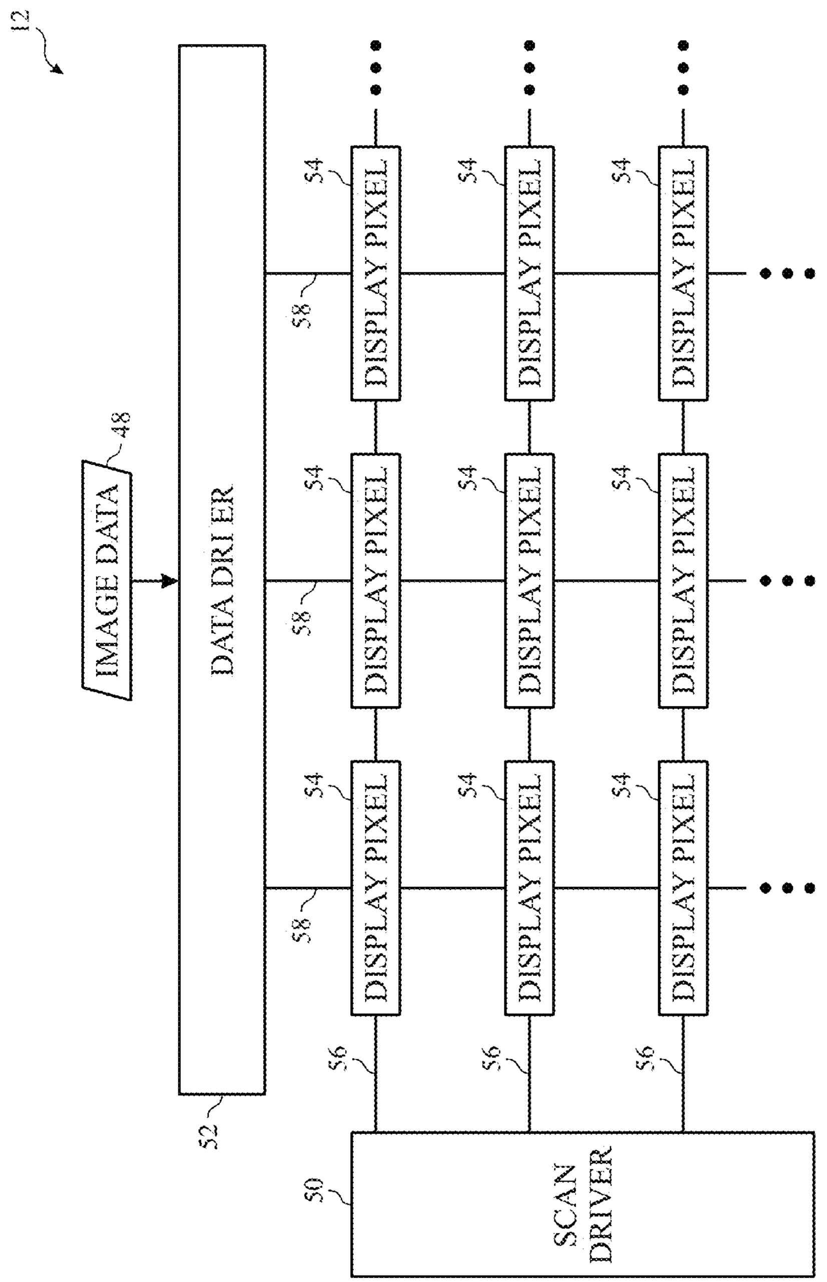
FIG. 6 is a block diagram of an electronic display of the electronic device, in accordance with an embodiment of the present disclosure.

As shown in FIG. 6, the electronic display 12 may receive image data 48 for display on the electronic display 12. The electronic display 12 includes display driver circuitry that includes scan driver circuitry 50 and data driver circuitry 52 that can program the image data 48 onto display pixels 54. The display pixels 54 may each contain one or more self-emissive elements, such as a light-emitting diodes (LEDs) (e.g., organic light emitting diodes (OLEDs) or micro-LEDs (μLEDs)). Different display pixels 54 may emit different colors. For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use cyan (C), magenta (M), or others. A group of display pixels 54 may form a single full-color pixel (e.g., a group of one red display pixel 54, one green display pixel 54, and one blue display pixel 54 may make up an RGB pixel).

The scan driver 50 may provide scan signals (e.g., pixel reset, data enable, on-bias stress) on scan lines 56 to control the display pixels 54 by row. For example, the scan driver 50 may cause a row of the display pixels 54 to become enabled to receive a portion of the image data 48 from data lines 58 from the data driver circuitry 52. In this way, an image frame of image data 48 may be programmed onto the display pixels 54 row by row. Other examples of the electronic display 12 may program the display pixels 54 in groups other than by row.

The display pixels may represent sub-pixels that each control a luminance of one color component (e.g., red, green, or blue for an RGB pixel arrangement).

The electronic display 12 may display an image by controlling the luminance of its display pixels based at least in part on image data associated with corresponding image pixels in image data.

Having provided some context with regard to possible forms that the electronic device 10 may take, the present discussion will now focus on the compensation system 27 of FIG. 1. As previously mentioned, the compensation system 27 may compensate for non-uniform gray levels and luminance properties for each pixel of the display 12. Generally, when the same electrical signal (e.g., voltage or current) is provided to each pixel of the display 12, each pixel should depict the same gray level. However, due to various sources of noise, frame mura effects, color mixing due to mask misalignment, and the like, the same voltage being applied to a number of pixels may result in a variety of different gray levels or luminance values depicted across the number of pixels. As such, the compensation system 27 may determine one or more compensation offset factors to adjust a digital value provided to each pixel to compensate for these differences. In particular, the compensation system 27 may access compensation maps including a global compensation map and a local compensation map (e.g., a 1×1 sub-pixel uniformity compensation map) that may correspond to compensation offset factors that may provide compensation to the pixels for increased visual quality. In response to accessing the compensation maps and determining the compensation offset factors to be applied to the display pixels 54, the compensation system 27 may then adjust the data signals provided to each display pixel 54 based on the compensation offset factors.

Generation of a 1×1 Sub-Pixel Uniformity Compensation Map

The compensation system 27 improves visual quality on the electronic display 12 and desirable user experience by providing uniformity compensation to the electronic display 12. In particular, the uniformity compensation is used to calibrate the display pixels 54. When an uncalibrated grouping of display pixels 54 receive a specific amount of current/voltage, the display pixels may emit light at various luminance. Such variances and inconsistencies in luminance at a particular voltage/current application reduces visual quality on an electronic device and desirable user experience. For example, the electronic display may serve as a red flashlight. In this case, to display the red flashlight on the electronic display 12, the electronic device 10 may send signals to each red sub-pixel to display red light at a high luminance. However, without compensating for the irregularities and differences in resulting luminance for the display pixels 54 at the given voltage application, the electronic display 12 may not be uniform in luminance. As such, it is desirable to provide compensation to each sub-pixel to increase visual quality.

The compensation system 27 (e.g., a sub-pixel uniformity compensation block) may be configured to compensate gray level data of the display pixel 54 (or a binning of display pixels 54). The compensation system 27 may apply additive or subtractive driving current to each sub-pixel of a display pixel 54 through internal driving voltage/current or external driving digital code. The additive or subtractive driving current (e.g., compensation) may be calculated based upon a compensation map generated from a panel uniformity calibration. The compensation map may further be stored in the electronic device 12.

Memory size and space may limit the sub-pixel uniformity compensation map used by the compensation system 27. Indeed, storing a high bit-depth sub-pixel uniformity compensation map in the electronic device 10 may be costly in memory. Present techniques and embodiments described herein provide schemes for storing sub-pixel uniformity compensation data in the electronic device 10 with a reduced storage size and low pixel mismatch. Indeed, using the techniques and embodiments described herein, high visual quality in the electronic device 10 may be achieved.

Figure 7:
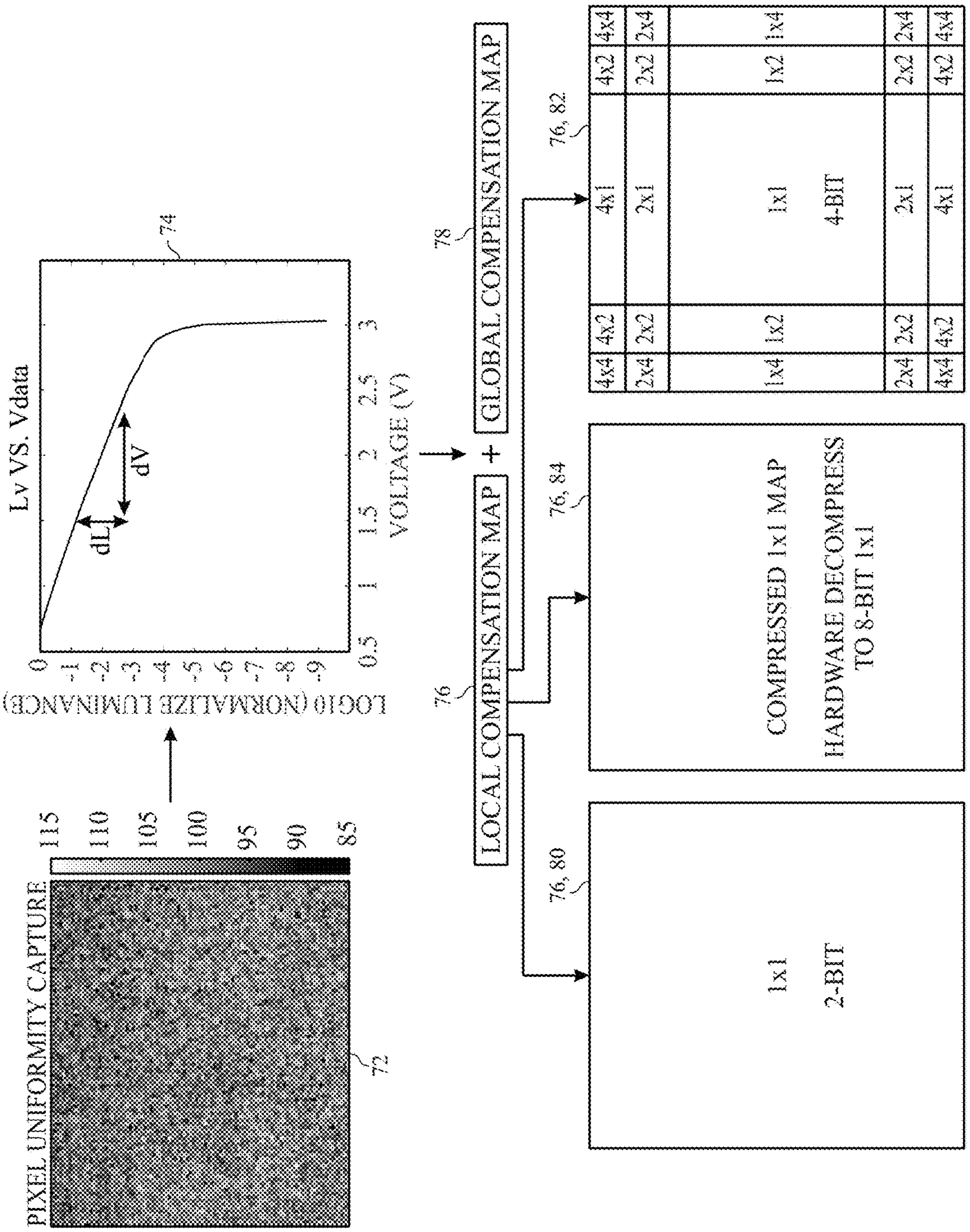
FIG. 7 illustrates a flow diagram showing example processes that may be use to generate a sub-pixel uniformity compensation map, in accordance with some embodiments of the present disclosure.

FIG. 7 illustrates a diagram for generating 1×1 sub-pixel uniformity compensation (SPUC) maps (e.g., per sub-pixel uniformity compensation maps), in accordance with example embodiments. In the depiction, a pixel uniformity capture 72 is captured by a camera (e.g., a high-resolution camera). The camera may capture image data of sub-pixels to measure pixel non-uniformity for the electronic display 12 of FIGS. 1-6. Specifically, 1×1 sub-pixel uniformity compensation data is captured with high precision. The camera may detect luminance measurements for sub-pixels in the pixel uniformity capture 72. The camera may capture the image data in a grayscale domain. Based on the data in the pixel uniformity capture 72, a graph 74 of log (Normalize Luminance (brightness)) versus voltage data is generated for the display pixels 54. The graph generally illustrates a luminance vs. voltage graph based on the pixel uniformity capture 72.

Using the data from the pixel uniformity capture 72 and present techniques, a local compensation map 76 (e.g., a sub-pixel uniformity compensation map, local uniformity compensation map) and a global compensation map 78 (e.g., a global uniformity compensation map) may be generated. The local compensation map 76 may have a binning size (e.g., 1×1, 2×2, 4×4) that is lower than a binning size of the global compensation map(s) 78. The global compensation map 78 may be used to determine a global voltage offset value (e.g., global compensation component) to be applied to a sub-pixel or group of sub-pixels based on a particular input voltage. The global compensation map 78 may share a common compensation factor for various display pixel binning. The local compensation map 76 may be used to determine a local voltage offset value (e.g., local compensation component) to be applied to a sub-pixel or sub-pixels based on a particular input voltage. To reduce memory size of the compensation map, the local compensation map 76 may be stored, in the electronic device, as an encoded per sub-pixel uniformity compensation map 80, a foveated compensation map 82, or a compressed sub-pixel uniformity compensation map 84. The encoded per sub-pixel uniformity compensation map 80 has a 2-bit bit depth. The foveated compensation map 82 has a 4-bit bit depth. The compressed sub-pixel uniformity compensation map 84 can be decompressed to 8-bit bit depth data for 1×1 display pixel 54 binning. Each of these local compensation maps 76 are suitable for storage with reduced memory size in the electronic device 10 and low sub-pixel mismatch.

Figure 8:
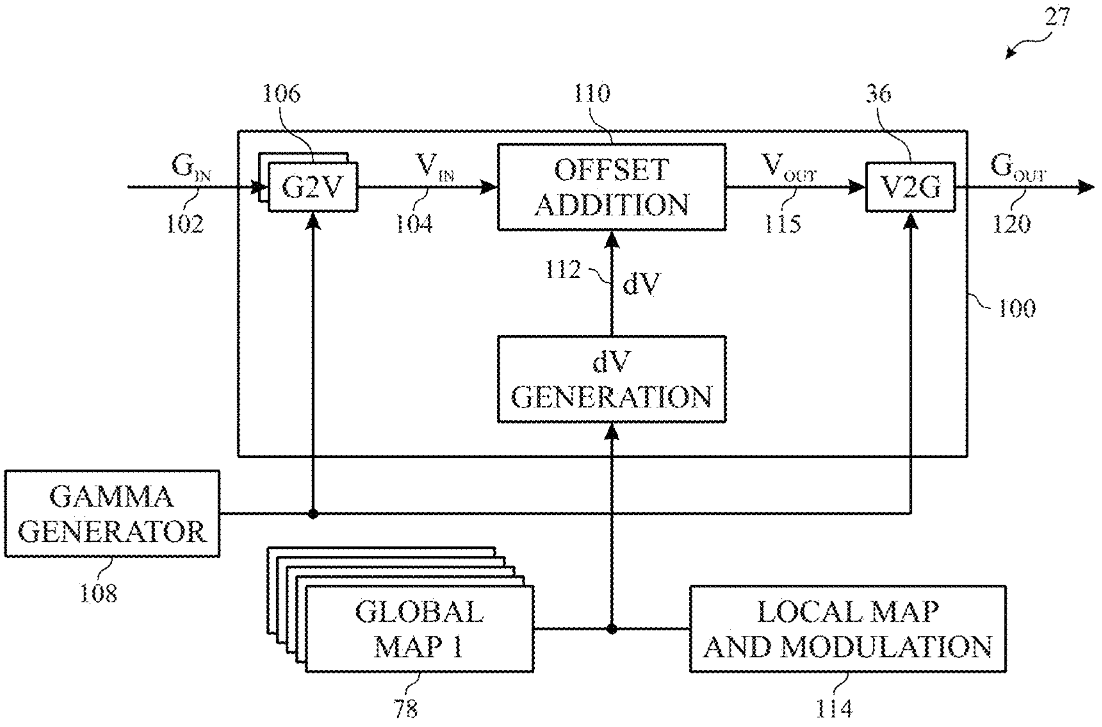
FIG. 8 is a block diagram of operations performed by the compensation system of the electronic device, in accordance with an embodiment of the present disclosure.

FIG. 8 illustrates a block diagram 100 of operations performed by the compensation system 27 of FIG. 1 indicating one embodiment in which the compensation system 27 may provide compensated image data to the display pixels 54 of the electronic device 10 of FIG. 1. It should be noted that the compensation system 27 may be implemented using software logic or hardware components. In any case, the compensation system 27 may receive input image data for each display pixel 54 of the electronic display 12 of FIG. 1, generate a compensated gray level value for each display pixel 54, and provide the compensated gray level value to the respective pixel driving circuitry to cause the respective display pixel 54 (e.g., sub-pixel) to illuminate according to the compensated gray level value.

In the illustrated depiction, first gray level data (G in) 102 corresponding to a display pixel 54 is received by the compensation system 27. The first gray level data 102 is converted into first voltage data ($V_{in}$) 104 using a gray level to voltage transformation component 106 and the gamma generator 108, which may apply a gamma correction factor to the first gray level data 102. For example, the first voltage data 104 may be obtained via querying a lookup table for voltage data corresponding to the first gray level data 102.

At offset addition block 110, a total voltage compensation data (dV) 112 is added to the first voltage data 104. The total voltage compensation data 112 is generated based on voltage compensation data from the global compensation map 78 and from the local compensation map and modulation component 114. The local compensation map and modulation component 114 may include one of the encoded local per sub-pixel uniformity compensation map 80, the foveated compensation map 82, or the compressed 1×1 sub-pixel uniformity compensation map 84. The compensation system 27 fetches, from the memory 20 of the electronic device 10, voltage compensation data from the local compensation map and modulation component 114 and the stored global uniformity compensation map 78 to determine the total voltage compensation data 112. The total voltage compensation data 112 is then added to the first voltage data 104 and the offset addition block 110 outputs second voltage data ($V_{out}$) 115. In some embodiments, the second voltage data may be determined according to the equation: $V_{out}=V_{in}+\Delta V_{Local}$ X Modulation $(V_{in})+\Delta V_{Global}(V_{in})$, where $\Delta V_{Local}$ and $\Delta V_{global}$ are the total voltage compensation data (dV) 112 values derived from the Local Map & Modulation component 114 and the global uniformity compensation map 78, respectively.

The second voltage data 115 is converted into second gray level data ($G_{out}$) 120 using a voltage to gray level (V2G) transformation component 118 and the gamma generator 108. Such operations described above with regard to FIG. 8 may be utilized in an embodiment during display operations on the electronic device 10. It should be noted that much of the following discussion will be in the context of the local compensation maps 76 and voltage compensation data from the local compensation maps 76. As such, "voltage compensation offset values" as discussed below, refer to compensation data from one of the local compensation maps 76.

Per sub-pixel compensation map encoded using low bit-depth code.

Figure 9A:
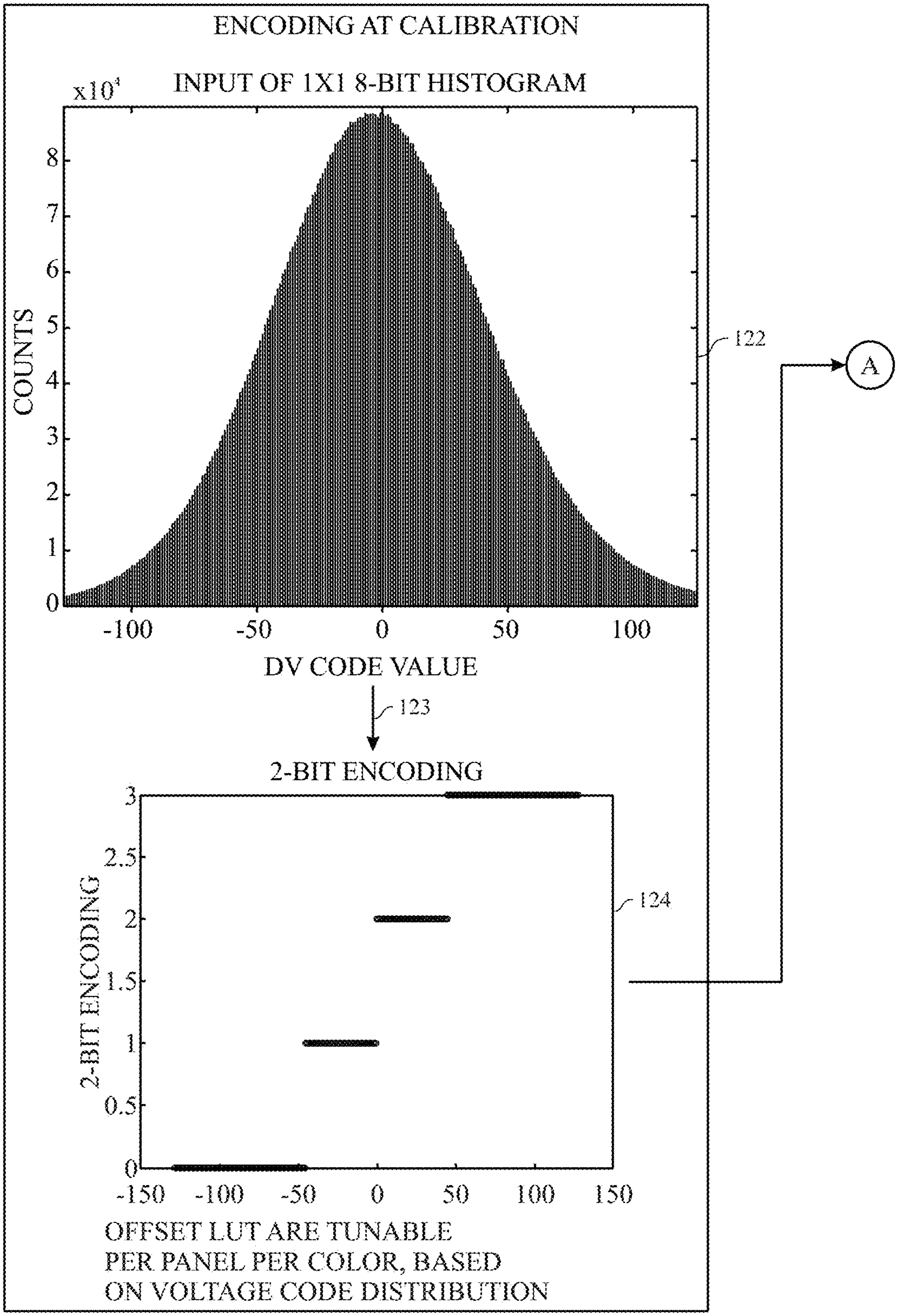
FIGS. 9A and 9B, collectively referred to as FIG. 9, provide an illustration of a 1×1 sub-pixel uniformity compensation data flow, in accordance with an embodiment of the present disclosure.
Figure 9B:
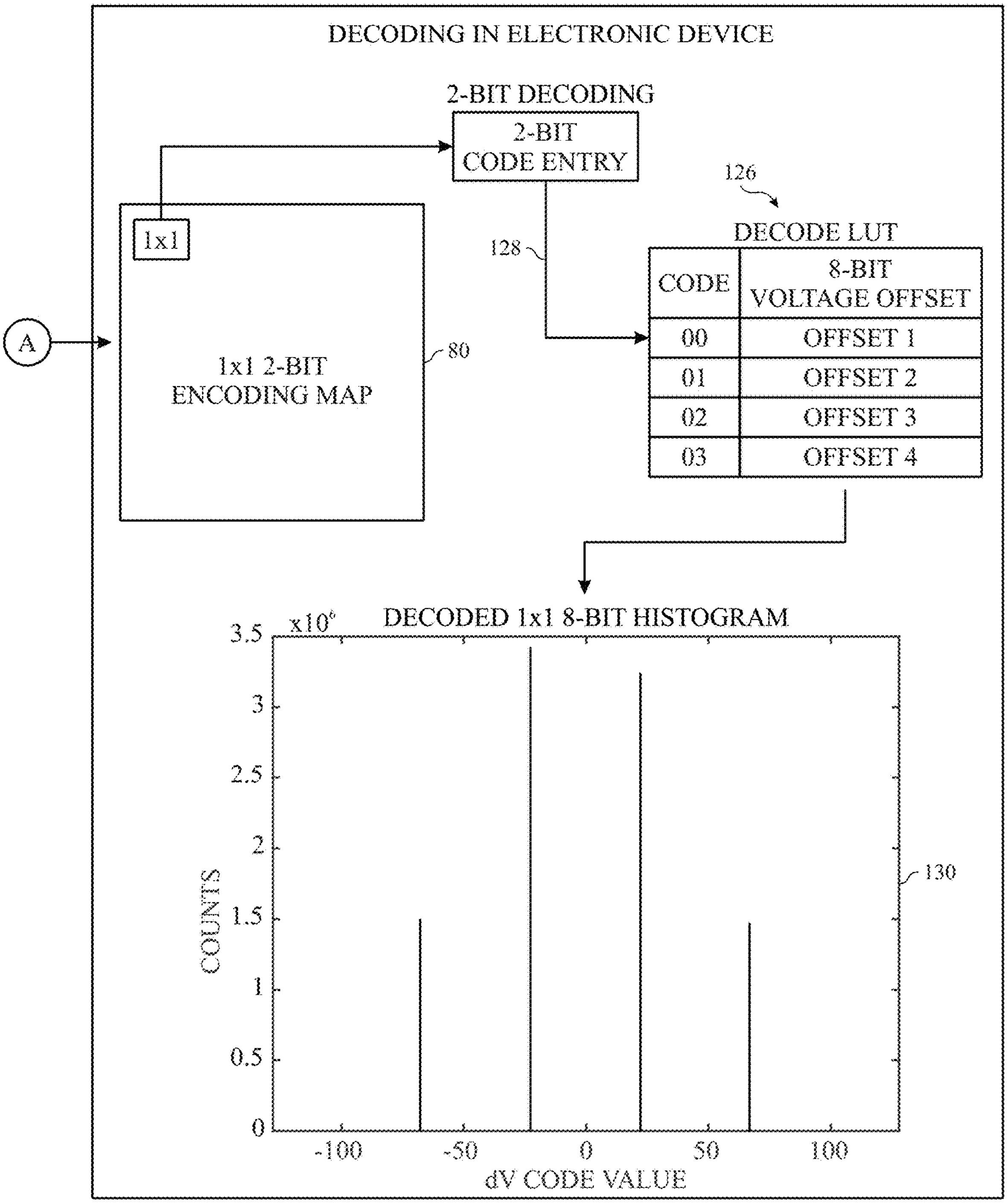

Storing 1×1 sub-pixel uniformity compensation calculation data for an 8-bit full panel is costly in memory. To reduce memory size and pixel mismatch error during compensation operations, sub-pixel uniformity compensation calculation data for an 8-bit full panel may be encoded using low bit-depth code. FIGS. 9A and 9B, collectively referred to as FIG. 9 is an example illustration of a 1×1 sub-pixel uniformity compensation data flow, in accordance with an embodiment of the present disclosure. Specifically, the 1×1 sub-pixel uniformity compensation data flow includes encoding sub-pixel uniformity compensation calculation data for an 8-bit full panel using low bit-depth code and decoding the encoded compensation map (e.g., the per sub-pixel uniformity compensation map 80 of FIG. 7). During a calibration period, 1×1 sub-pixel uniformity compensation raw data (e.g., high bit-depth compensation data) is encoded (as indicated by the arrow 123) using low bit-depth code. Using low bit-depth code enables 1×1 sub-pixel compensation data to be stored on the electronic device 10 with a reduced memory size. In the depiction, 1×1 sub-pixel uniformity compensation calculation raw data for an 8-bit panel is plotted on a histogram 122. In particular, the histogram 122 illustrates a voltage compensation distribution based on the display pixels 54 of electronic display 12. Specifically, the 1×1 sub-pixel uniformity compensation calculation raw data for the 8-bit panel contains voltage compensation data for each display pixel 54 of the electronic display 12. In the illustrated depiction, the distribution of voltage compensations approximates a normal distribution (e.g., Gaussian distribution).

Although much of the present discussion is discussed in the context of an 8-bit panel, it should be noted that other suitably sized panels may utilize the compensation techniques described herein. It also should be noted that an 8-bit panel may comprise display pixels 54 that may display 256 (i.e., $2^8$) shades of a color.

To reduce a memory size of a sub-pixel compensation map, each voltage compensation offset value of the 1×1 sub-pixel uniformity compensation calculation raw data for the 8-bit panel is assigned a 2-bit code to generate the encoded per sub-pixel uniformity compensation map 80 (e.g., low bit-depth data) suitable for storage on the electronic device 10 with reduced memory size. In the depiction, voltage compensation offset values ranging between specific ranges are assigned specific 2-bit codes (see the graph 124), thus generating the encoded per sub-pixel uniformity compensation map 80. A look-up table 126 for decoding the 2-bit code is also generated. The look-up table 126 is configured to output voltage compensation values corresponding to a set of 8-bit voltage compensation values corresponding to the 1×1 sub-pixel uniformity compensation calculation raw data for the 8-bit panel. Specifically, an 8-bit voltage compensation offset value is outputted from the look-up table 126 based on the 2-bit code inputted (as indicated by the arrow 128) to the look-up table 126. Using the 8-bit voltage compensation offset values outputted from the look-up table 126, the 1×1 sub-pixel uniformity compensation calculation raw data for the 8-bit panel may be approximated for a respective sub-pixel of the electronic display 12 to apply compensation. In some embodiments, each sub-pixel of the electronic display 12 may be assigned a 2-bit code that, when decoded by the look-up table 126, causes the look-up table 126 to output an 8-bit compensation value corresponding to a nearest voltage compensation offset values.

When all possible 2-bit code entries are input to the look-up table 126, all stored 8-bit voltage compensation values are output by the look-up table 126. The graph 130 illustrates a representation of the 1×1 sub-pixel uniformity compensation calculation raw data for the 8-bit panel decoded by the look-up table 126. The graph 130 (which is a decoded 1×1 sub-pixel uniformity compensation calculation raw data for the 8-bit panel plotted on a histogram) may approximate the initial input of the 1×1 sub-pixel uniformity compensation calculation raw data for the 8-bit panel. Storing the encoded per sub-pixel uniformity compensation map 80 (e.g., 1×1 2-bit encoding map) instead of the 1×1 sub-pixel uniformity compensation calculation raw data for the 8-bit panel in the memory of the electronic device 10 reduces memory size for sub-pixel uniformity compensation map. The look-up table 126 may also be configured for optimal compensation performance. To accomplish this, the look-up table may be tunable on a per panel per color basis based on the voltage compensation offset values (e.g., voltage code distribution) from the 1×1 8-bit histogram. Encoding the 1×1 sub-pixel uniformity compensation calculation raw data (e.g., 8-bit data) for the 8-bit panel into 2-bit data with the look-up table 126 for decoding the 2-bit data reduces memory size of the local compensation map 76 in the electronic device 10 while allowing for high visual quality on the electronic display 12.

Figure 10:
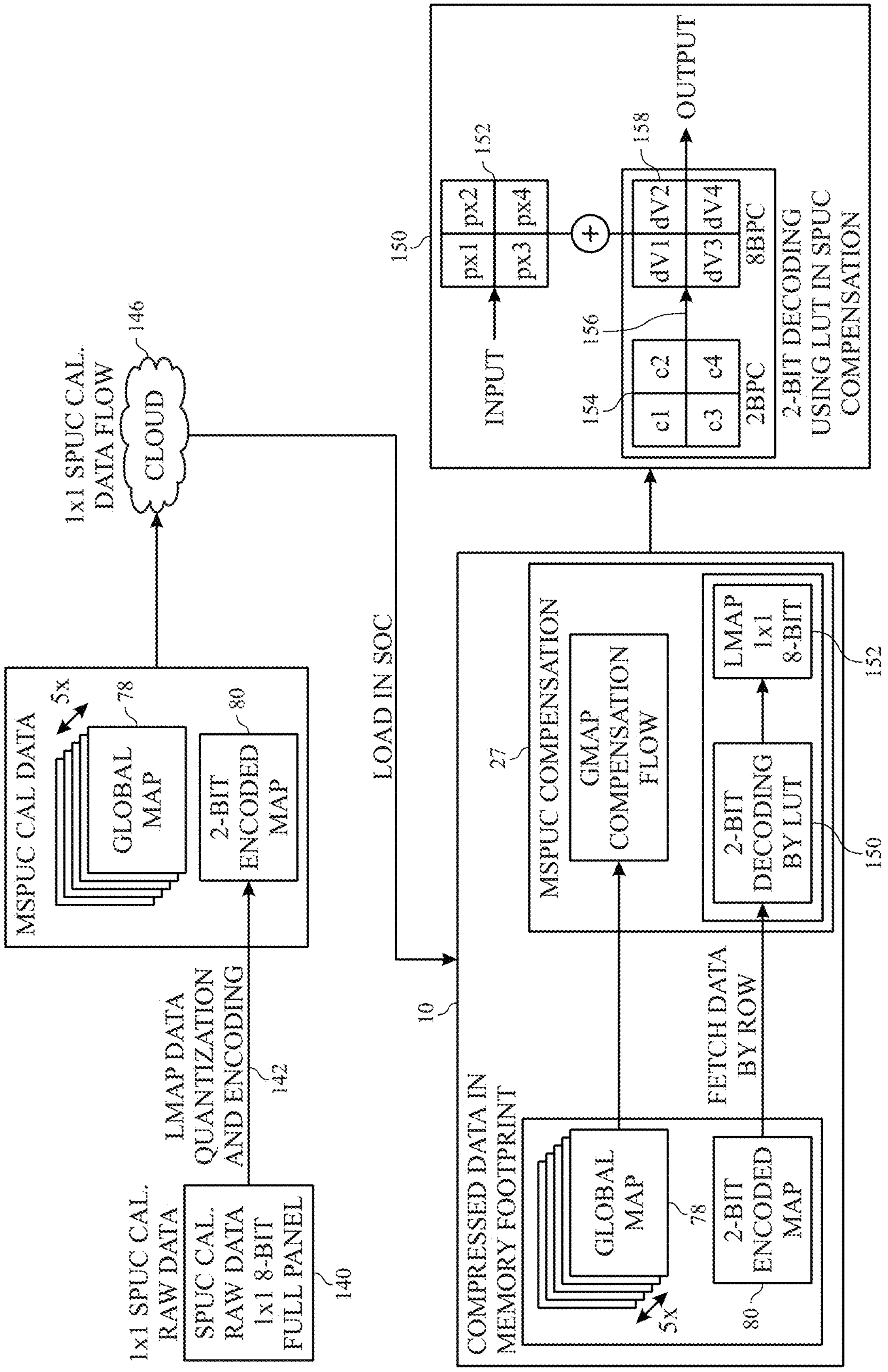
FIG. 10 is an illustration of a 1×1 sub-pixel uniformity compensation data flow, in accordance with an embodiment of the present disclosure.

FIG. 10 is an example illustration of a 1×1 sub-pixel uniformity compensation data flow, in accordance with an embodiment of the present disclosure. In the illustrated depiction, the encoded per sub-pixel uniformity compensation map 80 is generated using the 1×1 sub-pixel uniformity compensation calculation raw data for an 8-bit panel. Specifically, the 1×1 sub-pixel uniformity compensation calculation raw data for the 8-bit panel 140 is quantized and encoded (as indicated by the arrow 142) using 2-bit code to generate the encoded local per sub-pixel uniformity compensation map 80. The encoded local per sub-pixel uniformity compensation map 80 and the global compensation map 78 is uploaded or saved into a storage 146 such a remote or local database accessible by the electronic device 10.

The encoded per sub-pixel uniformity compensation map 80 and the global compensation map 78 is loaded into the electronic device 10 (e.g., on a system-on-chip). During display operations, the encoded local per sub-pixel uniformity compensation map 80 and the global compensation map 78 is fetched from the memory of the electronic device 10 and utilized to provide compensation to the display pixels 54 of the electronic device 10. In particular, to determine the local compensation component of the total voltage compensation data 112, data from the encoded per sub-pixel uniformity compensation map 80 is fetched (as indicated by the arrow 128) and sent to the look-up table 126 of FIG. 9 for decoding (as indicated by the region 150). For example, the data from the encoded per sub-pixel uniformity compensation map 80 may be fetched by row. The look-up table 126 returns an 8-bit voltage compensation offset value corresponding to each 2-bit code processed to generate 1×1 per sub-pixel uniformity compensation data to be used for compensating the display pixels 54.

Region 150 illustrates an example 2-bit map decoding using the look-up table 126 of FIG. 9 in the compensation system 27 (e.g., sub-pixel uniformity compensation block), in accordance with example embodiments. The compensation system 27 receives a 2×2 binning 152 (e.g., a group of four display pixels 54) as input. During operations in the compensation system 27, when the electronic device 10 stores the encoded per sub-pixel uniformity compensation map 80, 2-bit codes (as indicated by block 154) corresponding to each display pixel of the 2×2 binning 152 are sent (as indicated by the arrow 156) to the look-up table 126 (not shown), which will output four 8-bit voltage compensation offset values (e.g., one for each display pixel 54 (e.g., sub-pixel) of the 2×2 binning). Indeed, each of the display pixels of the 2×2 binning 152 may be compensated, based on the respective 2-bit code, with an 8-bit voltage compensation offset value. A 2-bit code assigned to a display pixel 54 of the 2×2 binning 152 corresponds to the 2bpc (i.e., bits per compensation) 154. After decoding the 2-bit code for a display pixel 54, 8bpc data 158 is applied to the display pixel 54.

The voltage compensation offset values from the encoded per sub-pixel uniformity compensation map 80 and the look-up may be applied in three modes. In particular, the compensation system 27 may use the data from the encoded per sub-pixel uniformity compensation map 80 and the look-up table 126 of FIG. 9 to determine local compensation offset component values for 1×1 binning, 2×2 binning, or 4×4 binning.

Figure 11:
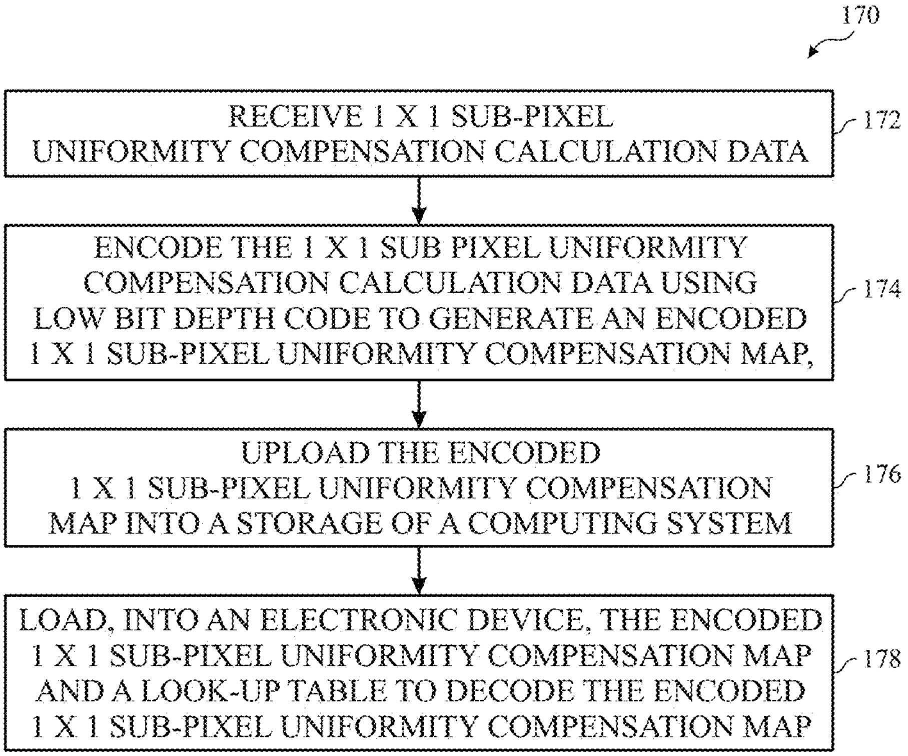
FIG. 11 illustrates a method for encoding 1×1 sub-pixel uniformity compensation data, in accordance with an embodiment of the present disclosure.

FIG. 11 is a method 170 for encoding 1×1 sub-pixel uniformity compensation data into the encoded local 1×1 sub-pixel uniformity compensation map 80 of FIG. 7, in accordance with an embodiment of the present disclosure. The method 170 begins with receiving (block 172) 1×1 sub-pixel uniformity compensation calculation data. For example, the 1×1 sub-pixel uniformity compensation calculation data may include 1×1 sub-pixel uniformity compensation calculation data for an 8-bit panel.

The method 170 continues with encoding (block 174) the 1×1 sub-pixel uniformity compensation calculation data using low bit-depth code to generate the encoded local 1×1 sub-pixel uniformity compensation map 80. The encoded 1×1 sub-pixel uniformity compensation map 80 may be lower in bit-depth than the 1×1 sub-pixel uniformity compensation calculation data. A look-up table for decoding the encoded local 1×1 sub-pixel uniformity compensation map 80 may also be generated at block 174. Specifically, the look-up table stores data of similar bit-depth as the 1×1 sub-pixel uniformity compensation calculation data. The look-up table is configured to decode the encoded 1×1 sub-pixel uniformity compensation map 80. As an example, 1×1 sub-pixel uniformity compensation calculation data for an 8-bit panel may be encoded using 2-bit code to generate the encoded 1×1 sub-pixel uniformity compensation map 80. The look-up table may decode the data from the 2-bit code to obtain four 8-bit voltage compensation offset values corresponding to four values of the 1×1 sub-pixel uniformity compensation calculation data for the 8-bit panel. These four values may be used to generate an approximation of the 8-bit local 1×1 sub-pixel uniformity compensation map and provide compensation data to the sub-pixels based on the approximation.

The method 170 continues with uploading (block 176) the encoded 1×1 sub-pixel uniformity compensation map 80 into a storage of a server. The look-up table 126 of FIG. 9 corresponding to the encoded 1×1 sub-pixel uniformity compensation map 80 is also uploaded into the storage of the server, which may include one or more (remote) databases. In some embodiments, a global sub-pixel uniformity compensation map is also uploaded to the storage of the server.

The method 170 continues with loading (block 178), into the electronic device 10 of FIG. 1, the encoded 1×1 sub-pixel uniformity compensation map 80 and the look-up table 126 of FIG. 9 to decode the encoded local 1×1 sub-pixel uniformity compensation map. In some embodiments, the global sub-pixel uniformity compensation map 78 is also loaded in the electronic device 10.

Figure 12:
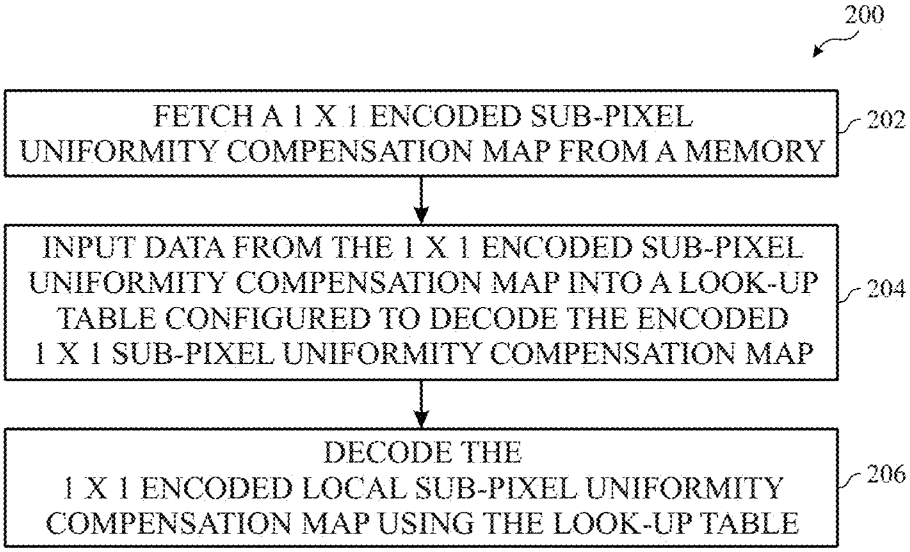
FIG. 12 illustrates a method for determining a voltage compensation offset using an encoded 1×1 sub-pixel uniformity compensation map, in accordance with an embodiment of the present disclosure.

FIG. 12 is a method 200 for decoding the encoded 1×1 sub-pixel uniformity compensation map 80, in accordance with an embodiment of the present disclosure. One or more steps of the method 200 may be performed during display operations on the electronic device 10 of FIG. 1.

The method 200 includes fetching (block 202), from a memory of the electronic device 10, data from the 1×1 encoded sub-pixel uniformity compensation map (e.g., 1×1 encoded sub-pixel uniformity compensation map 80 of FIGS. 9 and 10). The method 200 includes inputting (block 204) the data from the 1×1 encoded sub-pixel uniformity compensation map into a look-up table configured to decode the encoded 1×1 sub-pixel uniformity compensation map.

The method 200 includes decoding (block 206) the data from the 1×1 encoded sub-pixel uniformity compensation map using the look-up table to determine the local voltage compensation offset value for a display pixel. For example, 1×1 sub-pixel uniformity compensation data for an 8-bit panel may be encoded in a 2-bit encoded 1×1 sub-pixel uniformity compensation map 80. The 2-bit encoded local 1×1 sub-pixel uniformity compensation map 80 can be decoded, using the look-up table (e.g., the look-up table 126 of FIG. 9), into data corresponding to the 8-bit 1×1 local sub-pixel uniformity compensation data. Spatial interpolation may also be utilized when applying the voltage compensation offset values from the 8-bit 1×1 local sub-pixel uniformity compensation data corresponding to the electronic display 12.

Compressed Per Sub-Pixel Compensation Map

In an embodiment of the present disclosure, a local 1×1 sub-pixel uniformity compensation map is compressed using a compression algorithm to store sub-pixel uniformity compensation data on the electronic device 10 of FIG. 1 with a reduced memory size. The local 1×1 sub-pixel uniformity compensation map (e.g., local per sub-pixel uniformity compensation map) may be compressed using a lossy or lossless compression algorithm. As an example, when the local per sub-pixel uniformity compensation map is compressed using a lossy compression algorithm, the compression ratio may be 4:1.

Figure 13:
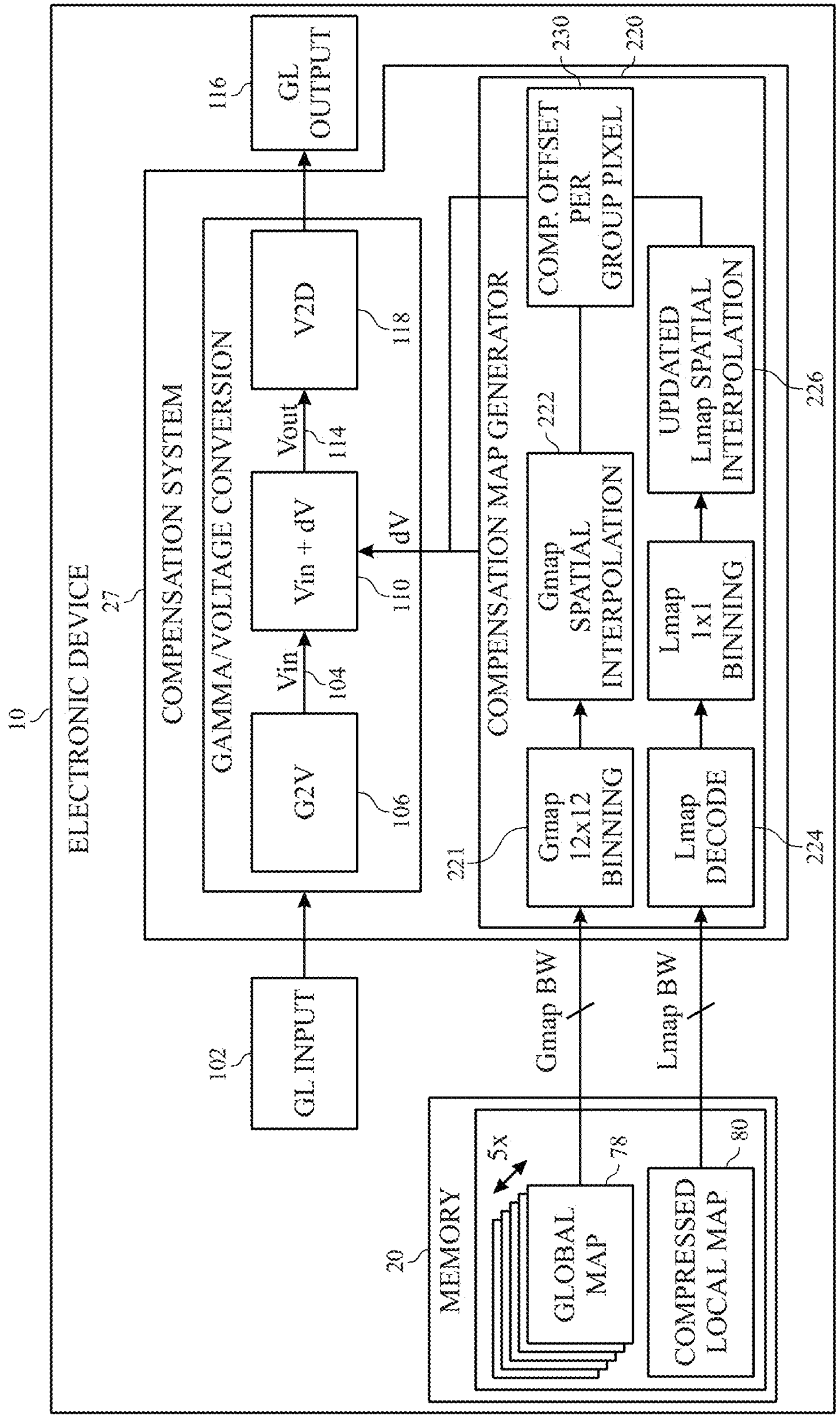
FIG. 13 illustrates a block diagram of operations performed by the compensation system of FIG. 1 indicating one embodiment in which the compensation system of FIG. 1 may provide compensated image data to display pixels of the electronic device of FIG. 1.

FIG. 13 illustrates a block diagram of operations performed on the electronic device 10 by the compensation system 27 of FIG. 1 indicating one embodiment in which the compensation system 27 may provide compensated image data (e.g., gray level output 116) to the display pixels 54. Some of the operations performed on the electronic device 10 by the compensation system 27 of FIG. 1 are similar to the operations performed on the electronic device 10 by the compensation system 27 of FIG. 1 as indicated by FIG. 8.

In the illustrated depiction of FIG. 13, the compensation system 27 includes a compensation map generator 220. During display operations of the electronic device 10, the compensation map generator 220 accesses, from the memory 20, the global compensation map 78 and the compressed per sub-pixel uniformity compensation map 84. The global compensation map(s) 78 corresponds to compensation data configured to be applied to 12×12 binning (block 221). Spatial interpolation is applied (block 222) to determine the global compensation voltage offset value that should be applied to first gray level data 102.

Once the compensation map generator 220 accesses the compressed per sub-pixel uniformity compensation map 84, data from the compressed local per sub-pixel uniformity compensation map 84 is retrieved and decompressed, via a decompressor 224 (e.g., decoder), to obtain (block 226) per sub-pixel compensation map for, as an example, an 8-bit panel. Spatial interpolation is then applied (block 228) to the per sub-pixel compensation map. The spatial interpolation component may smoothen and sharpen the display of the electronic device 10. The spatial interpolation may be applied to data from the per sub-pixel compensation map on a row by row basis or another suitable basis.

Finally, the local voltage compensation offset values are determined. The global compensation voltage offset values and the local voltage compensation offset values are then applied (block 230) on a per group pixel basis. For example, in some embodiments, the global compensation voltage offset values and the local voltage compensation offset values can be applied to a 1×1, 2×2, 4×4 binning, or higher binning.

Figure 14:
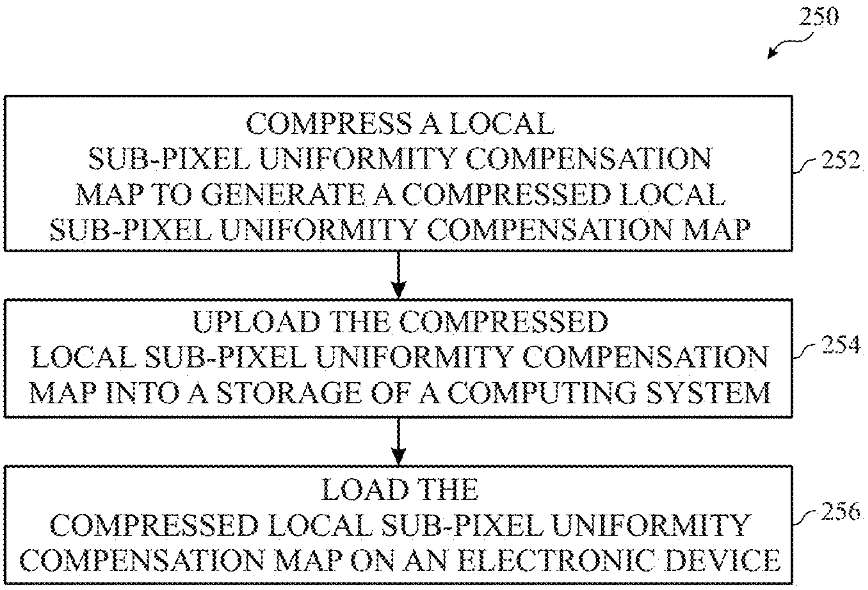
FIG. 14 illustrates a method for generating a compressed per sub-pixel uniformity compensation map, in accordance with an embodiment of the present disclosure.

FIG. 14 illustrates a method 250 for generating the compressed per sub-pixel uniformity compensation map 84 (e.g., a compressed 1×1 sub-pixel uniformity compensation map), in accordance with an embodiment of the present disclosure. The method 250 includes compressing (block 252) a 1×1 sub-pixel uniformity compensation map (e.g., the local compensation map 76) to generate a compressed 1×1 sub-pixel uniformity compensation map. The method 250 includes uploading (block 254) the compressed per sub-pixel uniformity compensation map into a storage of a server and loading (block 256) the compressed local per sub-pixel uniformity compensation map onto an electronic device.

Figure 15:
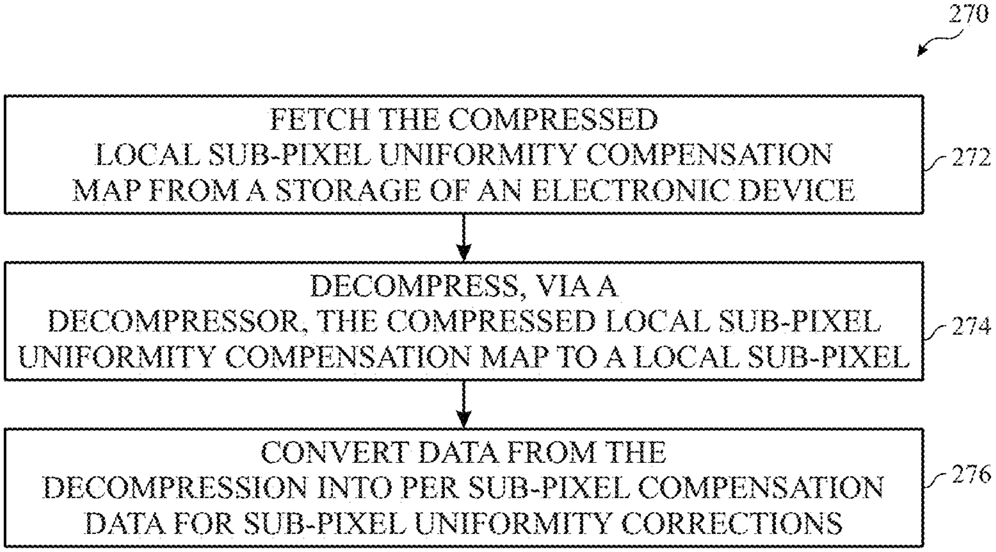
FIG. 15 illustrates a method for determining a voltage compensation offset using a compressed per sub-pixel uniformity compensation map, in accordance with an embodiment of the present disclosure.

FIG. 15 shows a method 270 for determining local sub-pixel uniformity compensation corrections in an electronic device using the compressed per sub-pixel uniformity compensation map 84, in accordance with an embodiment of the present disclosure. The method 270 may be performed by one or more components of the electronic device 10 such as the compensation system 27. The method 270 will be described in the context of the block diagram of FIG. 13.

The method 270 includes fetching (block 272), from the memory 20, data from the compressed per sub-pixel uniformity compensation map 84. The method 270 includes decompressing (block 274), via the decompressor 224, the data from compressed local per sub-pixel uniformity compensation map 84. For example, decompressing the compressed per sub-pixel uniformity compensation map 84 may result in a local 1×1 sub-pixel uniformity compensation map configured to be utilized for 1×1 binning. The hardware of the electronic device 10 can decompress the compressed per sub-pixel uniformity compensation map 84 to determine 8-bit compensation data corresponding to voltage offset data for a 1×1 binning.

The method 270 includes converting (block 276) the data from the decompression operation into per sub-pixel compensation data for sub-pixel uniformity corrections. For example, during display operations on the electronic device 10, compressed data in the compressed 1×1 sub-pixel uniformity compensation map 84 is fetched from the memory 20 and the decompressor 224 decompresses the compressed data to 1×1 compensation data for an 8-bit panel. Spatial interpolation may be performed on the decompressed data. The voltage offset compensation values from the compressed local per sub-pixel uniformity compensation map 84 may be applied in three modes: a voltage compensation offset applied to a 1×1 binning, a voltage compensation offset applied to a 2×2 binning, and a voltage compensation offset applied to a 4×4 binning. Other binning sizes may be possible.

Foveated Local Per Sub-Pixel Uniformity Compensation Map

In an embodiment of the present disclosure, the (encoded) foveated compensation map 82 is provided. The foveated compensation map 82 includes voltage compensation mappings for different binning for different display portions of the electronic device 10. The foveated compensation map 82 may be particularly useful in foveated display systems. In foveated display systems, image resolutions values vary across an image according to one or more focus points. For example, display portions in a periphery of a foveated display system may have a low image resolution while display portions near or at a focus portion of a foveated display system may have a high image resolution. In the foveated compensation map 82, compensation data for various binning are saved in the memory of the electronic device 10. In particular, voltage compensation data is applied to the various binning sizes based on a location relative to a focus point. For example, sub-pixel uniformity compensation corrections to be applied for periphery portions of a panel may be saved with higher binning size and sub-pixel uniformity compensation corrections to be applied for a focus portion may be saved with a lower binning size in the same foveated compensation map 82. Put another way, the foveated compensation map 82 is a combination of multiple compensation maps generated based on one or more different binning.

For example, 1×1 sub-pixel uniformity compensation data, 2×2 sub-pixel uniformity compensation data, and 4×4 sub-pixel uniformity compensation data for an 8-bit panel may be encoded into 4-bit depth data (e.g., the foveated compensation map 82). Thus, the foveated compensation map 82 may indeed be a collection of compensation maps of various binning and saved for various portions of the electronic display 12. By utilizing the foveated compensation map 82, local voltage compensation data may be saved in the electronic device 10 of FIG. 1 with a reduced memory size. Further, sub-pixel mismatch may be reduced by using the foveated compensation map 82 during display operations on the electronic device 10.

The process for generating the foveated compensation map 82 may be generally similar to the process for generating the encoded per sub-pixel uniformity compensation map illustrated in FIG. 9. Specifically, during a calibration period, 1×1 sub-pixel uniformity compensation data for an 8-bit panel may be encoded, using 4-bit codes, to generate the foveated compensation map 82. Voltage compensation values ranging between specific ranges are assigned a specific 4-bit code. A binning process is applied on the 1×1 sub-pixel uniformity compensation data to generate 2×2 binning compensation data and 4×4 binning compensation data. Turning back to FIG. 7, the foveated compensation map 82 is illustrated as having saved compensation data for various binning sizes. Indeed, the binning process may be applied based on a location of the display pixels 54 on the electronic display (e.g., where visual acuity is high or low). Then, the 1×1 sub-pixel uniformity compensation data, the 2×2 compensation data, and the 4×4 compensation data may be encoded using 4-bit depth code. A look-up table (e.g., a 4-bit entry look-up table) configured to decode the foveated compensation map 82 is also generated during a calibration period. The look-up table may be configured to output 8-bit voltage compensation offset data corresponding to the 1×1 sub-pixel uniformity compensation data for the 8-bit panel. The look-up table may store 16 voltage compensation offset values.

The local compensation voltage offset values received from the foveated compensation map 82 may be applied in various modes. Each binning size may include a corresponding 4-bit code entry for the look-up table. As such, during display operations, the 4-bit code entry is sent to the look-up table to determine a voltage compensation offset value for a particular sub-pixel or a particular binning of sub-pixels. For example, a local compensation voltage offset for a 4-bit code entry may be applied to each of a 1×i (i=1, 2, or 4) binning, 2×j (j=1, 2, or 4) binning of pixels, and 4×k (k=1, 2, or 4) binning of pixels depending on the particular mode of operation of the compensation system 27 or of the characteristics of the inputted gray level data.

Figure 16:
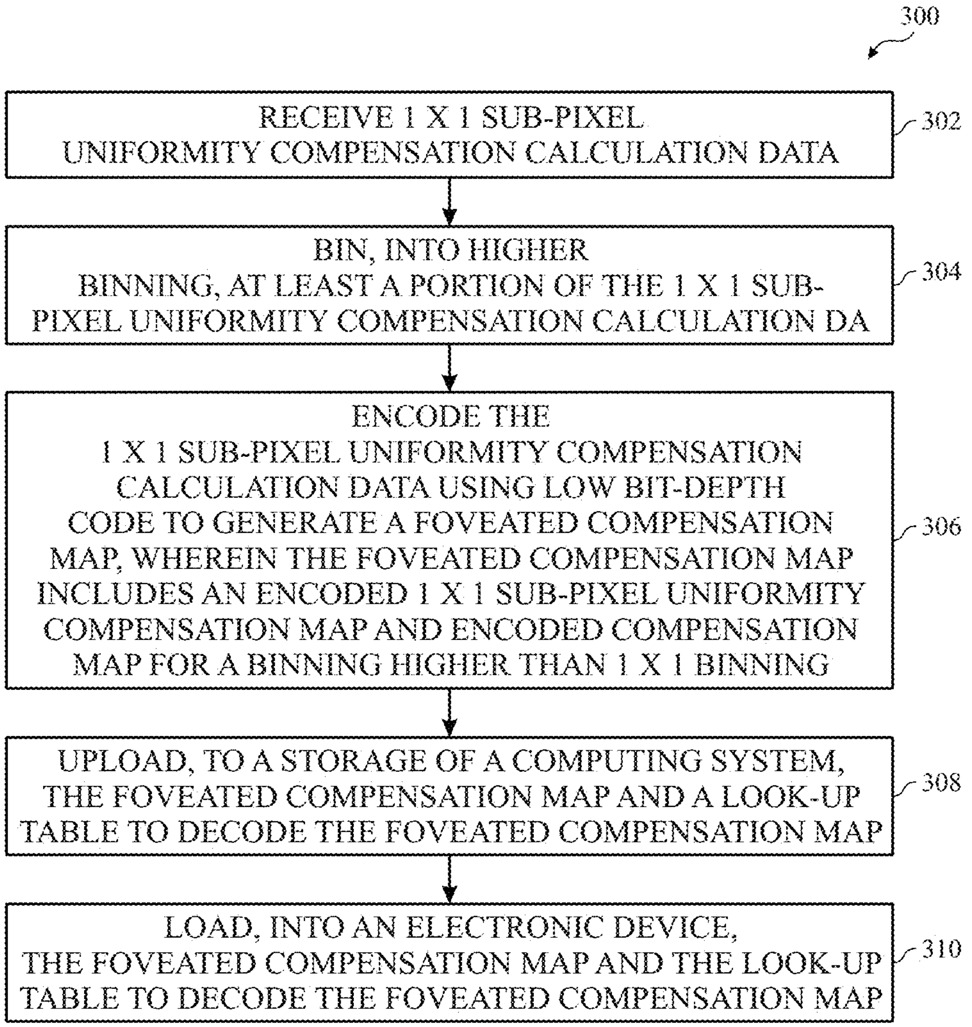
FIG. 16 illustrates a method for generating a foveated compensation map, in accordance with an embodiment of the present disclosure.

FIG. 16 is a method 300 for encoding sub-pixel uniformity compensation data into the foveated compensation map 82, in accordance with an embodiment of the present disclosure. The method 300 begins with receiving (block 302) 1×1 sub-pixel uniformity compensation calculation data. The method 300 continues to binning (block 304), into higher binning, at least a portion of the 1×1 sub-pixel uniformity compensation calculation data. At this step, a binning process may be performed on at least a portion of the 1×1 sub-pixel uniformity compensation calculation data to determine compensation data for higher binning such as a 1×2 or 4×4 binning.

The method continues to encoding (block 306) the 1×1 sub-pixel uniformity compensation calculation data using low bit-depth code to generate the foveated compensation map 82. The foveated compensation map includes an encoded 1×1 sub-pixel uniformity compensation map and one or more encoded compensation maps saved for higher binning such as an encoded 2×2 compensation map and an encoded 4×4 compensation map. In some embodiments, the binning of the compensation maps of the foveated compensation map 82 are based on one or more focus points or portions on the electronic display 12, which, in some embodiments, is a foveated display system. For example, a 1×1 (e.g., low binning size) sub-pixel uniformity compensation map may be stored in the foveated compensation map 82 for a center of a panel, while a higher binning size (e.g., 2×2, 1×2, 4×4) may be generated in the foveated compensation map 82 for peripheral areas of the panel.

The foveated compensation map 82 has a bit depth that is lower that the bit depth of the 1×1 sub-pixel uniformity compensation calculation data received at block 302. A look-up table for decoding the foveated compensation map 82 is also generated at block 306. The look-up table is configured to decode the foveated compensation map 82 to determine voltage compensation offset data corresponding to the panel at the portion of interest on the panel. Since the foveated compensation map 82 has a 4-bit bit depth, 4-bit codes from the foveated compensation map 82 may be sent to the look-up table to be decoded into compensation data having a bit-depth higher than 4-bit.

The method 300 continues with uploading (block 308) the foveated compensation map 82 into a storage of a server. For example, the foveated compensation map 82 may be transmitted, to the storage of the server via any suitable wired or wireless medium. The method 300 includes loading (block 310), into the electronic device 10, the foveated compensation map 82 and the look-up table to decode the foveated compensation map 82.

Figure 17:
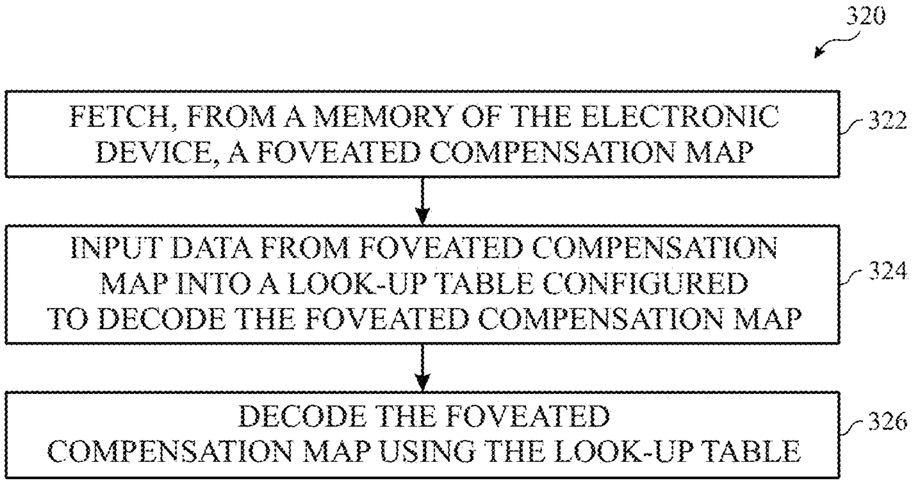
FIG. 17 illustrates a method for determining a voltage compensation offset using a foveated compensation map, in accordance with an embodiment of the present disclosure.

FIG. 17 illustrates a method 320 for determining a voltage compensation offset value using a foveated compensation map 82, in accordance with an embodiment of the present disclosure. One or more steps of the method 320 may be performed during display operations on the electronic device 10 of FIG. 1.

The method 320 includes fetching (block 322), from a memory of the electronic device 10, data from the foveated compensation map 82. The method 320 includes inputting (block 324) the data from the foveated compensation map 82 into a look-up table (LUT) configured to decode the foveated compensation map 82. For example, the foveated compensation map 82 may include a 1×1 sub-pixel uniformity compensation map saved for the center of the display panel where visual acuity may be high, and 2×2 and 4×4 binning compensation map for areas near or at the periphery of the display panel. The foveated compensation map 82 may have 4-bit bit depth. The look-up table may receive a 4-bit code entry corresponding to a portion of the display panel. The portion of the electronic device 10 may have a 2×2 binning, for example. The look-up table may be tuned on a per display panel per color basis.

The method 320 includes decoding (block 326) the data from the foveated compensation map 82 using the look-up table to determine voltage compensation offset values for the display panel or a portion thereof. The look-up table may store compensation data of a higher bit-depth than the bit depth of the foveated compensation map 82. Four-bit entry codes corresponding to a panel are processed by the look-up table, which may output local voltage compensation offset values that may be utilized for 1×1 sub-pixel uniformity compensation and compensation for higher binning. In some embodiments, spatial interpolation may be applied to the compensation data.

In some embodiments, the method 320 continues with combining the local compensation voltage offset value determined from the foveated compensation map 82 with a global compensation voltage offset value to determine a net compensation voltage offset value.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A display device comprising:

a display panel comprising:

a group of pixels, wherein each of the group of pixels comprise one or more pixels that each control a luminance of a color component of a corresponding pixel; and display driving circuitry configured to program, onto the group of pixels, image data to be displayed via the group of pixels;

a processor; and a memory accessible by the processor;

wherein the processor is configured to:

receive image data configured to be displayed via the group of pixels, wherein the image data comprises gray level data for a first pixel of the group of pixels;

convert the gray level data to first voltage data;

fetch second voltage data from encoding data of a compensation map, the second voltage data comprising 1×1 pixel uniformity compensation data for at least a portion of the group of pixels including the first pixel, wherein the 1×1 pixel uniformity compensation data comprises compensation data to mitigate non-uniformity between at least a portion of the group of pixels when supplied with a same electrical input signal and wherein the second voltage data is configured to be inputted to a look-up table configured to decode the second voltage data into voltage compensation data for the first pixel, and wherein the look-up table stores at least one voltage compensation offset value corresponding to the 1×1 pixel uniformity compensation data for the one or more pixels of the group of pixels;

determine a voltage compensation offset value associated with the first pixel based on the second voltage data;

generate compensated voltage data based in part on the voltage compensation offset value and the first voltage data;

convert the compensated voltage data to compensated gray level data; and transmit the compensated gray level data to the display driving circuitry associated with the first pixel.

2. The display device of claim 1, wherein the processor is configured to:

fetch third voltage data from a global compensation map;

determine a global voltage compensation offset value associated with the first pixel based on the third voltage data; and wherein the processor is configured to generate the compensated gray level data at least in part on the global voltage compensation offset value and the voltage compensation offset value.

3. The display device of claim 1, wherein spatial interpolation is applied to the compensated gray level data.

4. The display device of claim 1, wherein the compensation map comprises a 2-bit encoded pixel uniformity compensation map.

5. The display device of claim 4, wherein the fetched second voltage data comprises 2-bit code.

6. The display device of claim 1, wherein the compensation map comprises a 4-bit encoded compensation map, and wherein the second voltage data includes 2×2 voltage compensation data for some the group of pixels of the display panel not including the first pixel.

7. The display device of claim 1, wherein the display panel is an 8-bit display panel, wherein the look-up table is configured to output 8-bit compensation data, and wherein the voltage compensation offset value comprises a portion of the 8-bit compensation data.

8. The display device of claim 1, wherein the look-up table is configurable on a per color basis.

9. The display device of claim 1, wherein the image data comprises gray level data for a 2×2 binning including the first pixel of the group of pixels and wherein the look-up table is configured to output a local offset compensation factor for each pixel of the 2×2 binning including the first pixel of the group of pixels.

10. A method for encoding a compensation map for compensating one or more pixels of a group of pixels in a display device, the method comprising:

receiving 1×1 pixel uniformity compensation calculation data comprising compensation data to mitigate non-uniformity between at least a portion of the group of pixels when supplied with a same electrical input signal;

binning, into a binning greater than 1×1, at least a portion of the 1×1 pixel uniformity compensation calculation data; and encoding the 1×1 pixel uniformity compensation calculation data to generate a foveated compensation map, wherein the foveated compensation map includes an encoded 1×1 pixel uniformity compensation map and encoded compensation map for the binning greater than 1×1 binning.

11. The method of claim 10, comprising:

loading, into the display device, the foveated compensation map and a look-up table to decode the foveated compensation map.

12. The method of claim 10, wherein the encoded 1×1 pixel uniformity compensation map of the foveated compensation map is mapped to a portion of the display device and wherein the encoded compensation map for a binning higher than 1×1 binning is mapped to another portion of the display device.

13. The method claim 10, comprising:

configuring a look-up table to decode the foveated compensation map.

14. The method of claim 13, wherein the foveated compensation map is encoded using 4-bit code and wherein the look-up table is configured to receive data from the foveated compensation map and output compensation data.

15. A compensation system of a display device, the compensation system comprising:

a processor configured to provide compensated data to display driving circuitry configured to program image data onto a pixel of a group of pixels of the display device by:

receiving image data configured to be displayed on the pixel, wherein the image data comprises gray level data for the pixel;

converting the gray level data to first voltage data;

fetching, from a memory of the display device, compressed 1×1 pixel uniformity compensation data for the pixel, wherein the compressed 1×1 pixel uniformity compensation data comprises compensation data to mitigate non-uniformity between the pixel and one or more other pixels when supplied with a same electrical input signal;

decompressing the compressed 1×1 pixel uniformity compensation data via a decompressor, wherein the decompressed data comprises the 1×1 pixel uniformity compensation data for the pixel;

determining a voltage compensation offset value associated with the pixel based on the 1×1 pixel uniformity compensation data for the pixel;

generating compensated voltage data based in part on the voltage compensation offset value and the first voltage data;

converting the compensated voltage data to compensated gray level data; and transmitting the compensated gray level data to the display driving circuitry to program the pixel based upon the compensated data.

16. The compensation system of claim 15, wherein the compressed 1×1 pixel uniformity compensation data is part of a compressed 1×1 pixel uniformity compensation map.

17. The compensation system of claim 16, wherein the compressed 1×1 pixel uniformity compensation data for the pixel was compressed via a lossy or lossless algorithm.

18. The compensation system of claim 15, wherein the compressed 1×1 pixel uniformity compensation data is part of an encoded per pixel uniformity compensation map.

19. The compensation system of claim 15, wherein the compressed 1×1 pixel uniformity compensation data is part of a foveated compensation map.

20. The compensation system of claim 15, wherein the processor is configured to transmit the compensated gray level data to a plurality of pixels including the pixel, and wherein the processor is configured to apply spatial interpolation to the compensated gray level data.

* * * * *